United States Patent
Ahluwalia

(10) Patent No.: US 10,264,517 B2
(45) Date of Patent: Apr. 16, 2019

(54) OPTIMIZATION FOR PRIORITY-BASED NETWORK IDENTIFIER SCANS

(71) Applicant: AT&T Mobility II LLC, Atlanta, GA (US)

(72) Inventor: Inderpreet Singh Ahluwalia, Austin, TX (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/436,740

(22) Filed: Feb. 17, 2017

(65) Prior Publication Data

US 2018/0242229 A1   Aug. 23, 2018

(51) Int. Cl.
| | |
|---|---|
| *H04W 4/00* | (2018.01) |
| *H04W 48/16* | (2009.01) |
| *H04W 8/20* | (2009.01) |
| *H04W 8/06* | (2009.01) |
| *H04M 15/00* | (2006.01) |
| *H04W 8/04* | (2009.01) |

(Continued)

(52) U.S. Cl.
CPC ............ *H04W 48/16* (2013.01); *H04W 8/06* (2013.01); *H04W 8/205* (2013.01); *H04M 15/751* (2013.01); *H04W 8/04* (2013.01); *H04W 36/14* (2013.01); *H04W 48/18* (2013.01); *H04W 84/042* (2013.01)

(58) Field of Classification Search
CPC ....... H04W 48/16; H04W 8/06; H04W 8/205; H04W 84/042; H04W 48/18; H04W 8/04; H04W 36/14; H04M 15/751
See application file for complete search history.

(56) References Cited

U.S. PATENT DOCUMENTS

| | | |
|---|---|---|
| 5,839,069 A | 11/1998 | Keshavachar et al. |
| 5,950,130 A | 9/1999 | Coursey |

(Continued)

FOREIGN PATENT DOCUMENTS

| | | |
|---|---|---|
| CN | 101299870 A | 11/2008 |
| CN | 103068009 A | 4/2013 |

(Continued)

OTHER PUBLICATIONS

Cordier et al., "E 2 R cognitive pilot channel concept." Proceedings of 15th 1st Mobile and Wireless Summit (2006). [https://www.researchgate.net/profile/Klaus_Moessner/publication/228736729_E_2_R_Cognitive_Pilot_Channel_concept/links/02e7e52aae61bb08d9000000.pdf]. Retrieved on Dec. 12, 2016, 5 pages.

*Primary Examiner* — Barry W Taylor

(74) *Attorney, Agent, or Firm* — Amin, Turocy & Watson, LLP

(57) ABSTRACT

Battery life of a user equipment (UE) can be extended when the UE is roaming internationally in a country that has multiple carrier networks each utilizing multiple public land mobile network (PLMN) identifiers. Scan control tables, stored in a universal integrated circuit card (UICC) of the UE, are populated with the identifiers of a PLMN having the highest priority in a defined area (e.g., Circle). A roaming control applet of the UICC can compare serving cell data with the scan control tables to determine if the UE is to perform a higher priority (HP) PLMN search. Utilization of the scan control table avoids unnecessary searches for HPPLMNs that are unavailable in the UE's current location and accordingly extends battery life of the UE.

20 Claims, 16 Drawing Sheets

(51) Int. Cl.
*H04W 36/14* (2009.01)
*H04W 48/18* (2009.01)
*H04W 84/04* (2009.01)

(56) References Cited

U.S. PATENT DOCUMENTS

| | | |
|---|---|---|
| 6,961,569 B2 | 11/2005 | Raghuram et al. |
| 7,937,083 B2 | 5/2011 | Oommen |
| 8,301,136 B2 | 10/2012 | Kim et al. |
| 8,442,516 B2 | 5/2013 | Swaminathan et al. |
| 8,611,307 B2 | 12/2013 | Edara |
| 8,731,622 B2 | 5/2014 | Kanade et al. |
| 8,892,097 B2 | 11/2014 | Manna et al. |
| 8,897,224 B2 | 11/2014 | Ben-eli |
| 9,031,555 B2 | 5/2015 | Kim |
| 9,125,146 B1 | 9/2015 | Edara et al. |
| 9,277,492 B2 | 3/2016 | Juang et al. |
| 9,313,726 B2 | 4/2016 | Dang et al. |
| 2008/0194253 A1* | 8/2008 | Kuo ............... H04W 48/16 455/433 |
| 2008/0200169 A1 | 8/2008 | Gao |
| 2013/0109377 A1* | 5/2013 | Al-Khudairi ......... H04W 48/16 455/432.1 |
| 2015/0208327 A1 | 7/2015 | Baratam et al. |
| 2015/0312873 A1* | 10/2015 | Cormier ............... H04B 1/3816 455/432.1 |
| 2015/0351009 A1 | 12/2015 | Patel et al. |
| 2016/0105843 A1* | 4/2016 | Xue ............... H04W 48/18 455/426.1 |
| 2016/0309399 A1 | 10/2016 | Swaminathan et al. |
| 2016/0309400 A1* | 10/2016 | Swaminathan ....... H04W 48/16 |
| 2016/0345248 A1 | 11/2016 | Mackenzie |
| 2017/0346746 A1* | 11/2017 | Zhang ................ H04L 47/24 |

FOREIGN PATENT DOCUMENTS

| | | |
|---|---|---|
| GB | 2413737 A | 11/2005 |
| WO | 2015143698 A1 | 10/2015 |
| WO | 2015143706 A1 | 10/2015 |

* cited by examiner

| Preferred PLMN List | MNC-MCC | Operator |
|---|---|---|
| [1] | 404-90 | Airtel |
| [2] | 405-800 | Aircel |
| [3] | 404-27 | Vodafone |
| [4] | 405-81 | Aircel |
| [5] | 404-31 | Airtel |
| [6] | 404-5 | Vodafone |
| [7] | 404-41 | Aircel |
| [8] | 404-20 | Vodafone |
| [9] | 404-2 | Airtel |
| [10] | 404-43 | Vodafone |
| [11] | 404-10 | Airtel |
| [12] | 404-45 | Airtel |
| [13] | 404-67 | Reliance |
| [14] | 404-46 | Vodafone |
| [15] | 404-30 | Vodafone |

How the PLMNs relate geographically in India

— 375

| Preferred PLMN List | MNC-MCC | Operator | State/ Geographical Area |
|---|---|---|---|
| [1] | 404-90 | Airtel | Maharashtra |
| [2] | 405-800 | Aircel | Delhi |
| [3] | 404-27 | Vodafone | Maharashtra |
| [4] | 405-81 | Aircel | AP & Telangana |
| [5] | 404-31 | Airtel | Kolkata |
| [6] | 404-5 | Vodafone | Gujarat |
| [7] | 404-41 | Aircel | Chennai |
| [8] | 404-20 | Vodafone | Mumbai |
| [9] | 404-2 | Airtel | Punjab |
| [10] | 404-43 | Vodafone | Tamil Nadu |
| [11] | 404-10 | Airtel | Delhi |
| [12] | 404-45 | Airtel | Karnataka |
| [13] | 404-67 | Reliance | MP |
| [14] | 404-46 | Vodafone | Kerala |
| [15] | 404-30 | Vodafone | Kolkata |

FIG. 3C

| Relative priority in GPLMN | PLMN ID | Carrier | Circle | Entry required in Scan Control Table? | Notes |
|---|---|---|---|---|---|
| [1] | 404-90 | Airtel | Maharashtra | No | Already highest priority |
| [2] | 405-800 | Aircel | Delhi | Yes | Disable scans - highest priority in Circle |
| [3] | 404-27 | Vodafone | Maharashtra | No | Need to enable scans to get to [1] |
| [4] | 405-81 | Aircel | AP & Telangana | Yes | Disable scans - highest priority in Circle |
| [5] | 404-31 | Airtel | Kolkata | Yes | Disable scans - highest priority in Circle |
| [6] | 404-5 | Vodafone | Gujarat | Yes | Disable scans - highest priority in Circle |
| [7] | 404-41 | Aircel | Chennai | Yes | Disable scans - highest priority in Circle |
| [8] | 404-20 | Vodafone | Mumbai | Yes | Disable scans - highest priority in Circle |
| [9] | 404-2 | Airtel | Punjab | Yes | Disable scans - highest priority in Circle |
| [10] | 404-43 | Vodafone | Tamil Nadu | Yes | Disable scans - highest priority in Circle |
| [11] | 404-10 | Airtel | Delhi | No | Need to enable scans to get to [2] |
| [12] | 404-45 | Airtel | Karnataka | Yes | Disable scans - highest priority in Circle |
| [13] | 404-67 | Reliance | MP | Yes | Disable scans - highest priority in Circle |
| [14] | 404-46 | Vodafone | Kerala | Yes | Disable scans - highest priority in Circle |
| [15] | 404-30 | Vodafone | Kolkata | No | Need to enable scans to get to [5] |

FIG. 5

OPTIMIZATION FOR PRIORITY-BASED NETWORK IDENTIFIER SCANS

TECHNICAL FIELD

The subject disclosure relates to wireless communications, e.g., optimization for priority-based network identifier scans.

BACKGROUND

Battery life of a device is a key factor for customers, e.g., when they are deciding on which device to purchase. Additionally, a roaming footprint of the device plays another part in a potential customer's choice, e.g., if the customer is a global traveler. The battery life of a device is affected by various factors, such as (i) a radio access network (RAN) setting of a visited carrier, (ii) device configuration, and/or (iii) data stored within a subscriber identity module (SIM) card of the device. As an example, the data stored within the SIM card can dictate for which carriers to search and/or their priorities.

Standards defined by the 3rd Generation Partnership Project (3GPP) state that, when a device is roaming, the device shall periodically perform public land mobile network (PLMN) searches for higher priority PLMNs belonging to the same serving country. When in automatic mode, search parameters are defined by a preferred PLMN list stored on a SIM (or universal SIM (USIM)) application, for example, universal integrated circuit card (UICC). In most cellular network deployments, a carrier typically uses a single PLMN identifier (ID) nationwide; however, in some cases, a carrier can utilize multiple PLMN IDs for different areas within the country. India is an example of the latter. In the case of India, each carrier offers service in a number of different states (called "Circles") but the PLMN ID for the same carrier in different circles is different for the different circles, i.e., the different circles do not use a single PLMN ID. In such a scenario, periodic rescans for higher priority PLMNs that may not exist in a particular area, result in a poor user experience and degraded battery life.

BRIEF DESCRIPTION OF THE DRAWINGS

FIGS. 3A-3C illustrate an example carrier deployment model, wherein carriers utilize multiple network identifiers within a country.

FIG. 5 illustrates an example table for configuring a scan control data, according to an aspect of the subject specification.

DETAILED DESCRIPTION

Figure 1:
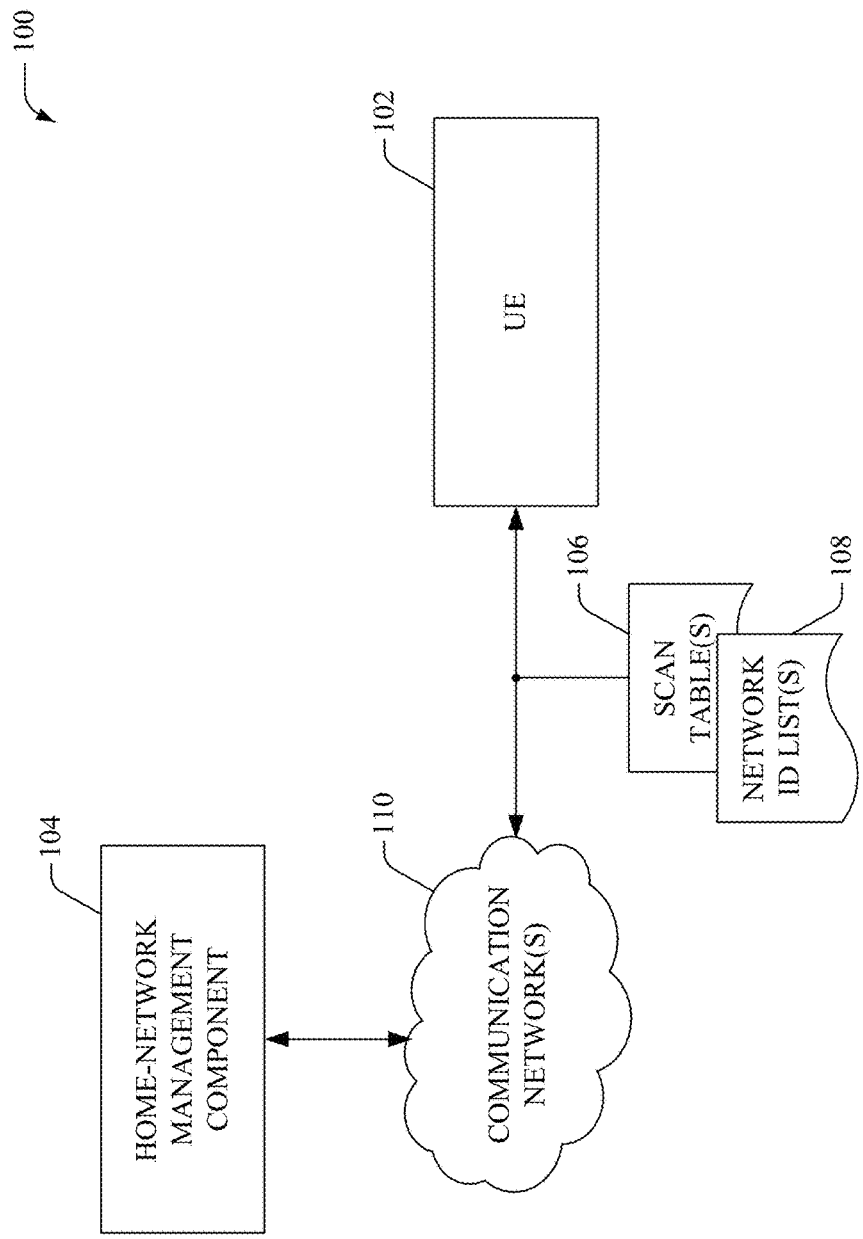
FIG. 1 illustrates an example system that conserves battery life of a user equipment (UE) that is roaming in a country that has carrier networks that utilize multiple network identifiers.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive, electrically erasable programmable read-only memory (EEPROM), etc.). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. Further, the terms "carrier network," "carrier," and the like are utilized interchangeably in the subject specification and related drawings and refer to network deployed by a communication service provider, for example, a cellular or telecommunications service provider, mobile network operator, wireless carrier, etc.

Aspects or features of the disclosed subject matter can be exploited in substantially any wired or wireless communication technology; e.g., universal mobile telecommunications system (UMTS), Wi-Fi, worldwide interoperability for microwave access (WiMAX), general packet radio service (GPRS), enhanced GPRS, third generation partnership project (3GPP) long term evolution (LTE), third generation partnership project 2 (3GPP2) ultra mobile broadband (UMB), high speed packet access (HSPA), Zigbee, or another IEEE 802.XX technology, fifth generation (5G), narrowband (NB), etc. Additionally, substantially all aspects of the disclosed subject matter can be exploited in legacy (e.g., wireline) telecommunication technologies.

In one aspect, the subject disclosure relates to a system, comprising: a processor and a memory that stores executable instructions that, when executed by the processor, facilitate performance of operations, comprising determining scan control data that comprises information representing a group of the different network identifiers, wherein the group of the different network identifiers comprises a network identifier having a highest rank within a portion of the different portions in response to determining that the user equipment is roaming within an area where visitor network devices of visitor networks utilize different network identifiers in different portions of the area. Further, the operations comprise based on the scan control data, controlling a frequency of scans for a target cell identifier of the different network identifiers that has a higher rank than that of a serving cell identifier of the different network identifiers.

Further, another aspect of the subject disclosure relates to a method, comprising determining, by a system comprising a processor, that a user equipment has registered with a visitor network device of a visitor network of visitor networks deployed in a country that utilize multiple network identifiers nationwide. Further, the method comprises in response to the determining, facilitating, by the system, a transmission of scan control data to the user equipment, wherein the scan control data is employable to control a frequency of searches, performed by the user equipment, for detecting a first network identifier of the multiple network identifiers that has been assigned a higher priority than a second network identifier of the multiple network identifiers that is associated with a cell serving the user equipment.

In yet another aspect, the subject disclosure relates to a machine-readable storage medium, comprising executable instructions that, when executed by a processor, facilitate performance of operations, comprising receiving priority data indicative of a ranking of network identifiers of visitor carrier networks, wherein the priority data is employable to couple the user equipment with a first access point device associated with a first identifier of the network identifiers that is determined to have a first ranking that satisfies a defined criterion; and receiving scan control data that is employable to disable scanning for a signal from a second access point device associated with a second identifier of the network identifiers that is determined to have a second ranking that is higher than the first ranking.

Referring initially to FIG. 1, there illustrated is an example system 100 that conserves battery life of a user equipment (UE) that is roaming in a country that deploys carrier networks that utilize multiple network identifiers (e.g., mobile network codes (MNCs) and/or public land mobile network (PLMN) identifiers), according to one or more aspects of the disclosed subject matter. The battery life of a UE plays a significant role in user experience and/or satisfaction and is oftentimes an important criterion for purchase (or lease) of a specific UE (e.g., specific make and/or model). As the number of features and/or applications installed on and/or performed by the UE grows, battery life is adversely affected. Moreover, users prefer UEs that can provide longer talk time and/or standby time. Thus, battery power management is increasingly important to provide a positive consumer experience. In one example, the battery life can be extended by switching off components and/or changing an operating mode of the components (e.g., to a sleep mode) when the components are not being utilized. System 100 controls timing and/or frequency of network identifier scans while UE 102 is roaming to increase the battery life of the UE 102. As an example, UE 102 can comprise, but is not limited to most any consumer electronic devices, for example, a tablet computer, a digital media player, a digital photo frame, a digital camera, a media player, a cellular phone, a personal computer, a smart television, a wearable device, a smart phone, a laptop, a gaming system, set top boxes, Internet of Things devices, connected vehicles, at least partially automated vehicles (e.g., drones), etc.

Conventional telecommunication standards (e.g., third generation partnership project (3GPP)) specify that in a VPLMN (visitor PLMN), the device (e.g., UE 102) shall perform periodic searches for higher priority PLMNs (HPPLMN) of the same serving country. (See, e.g., 3GPP 23.122, Section 4.4.3.3.1) In one example, the HPPLMN search is to be performed periodically at a rate that is specified by data stored within a Subscriber Identity Module (SIM) or Universal SIM card of the UE 102. As an example, the UE 102 can perform HPPLMN searches in multiples of six minutes (with the fastest rate being once every six minutes). During the search, the UE 102 can measure power on all frequencies of all bands that it supports, synchronize to each frequency on which there is appreciable energy, and read the PLMN identification of a cell. Additionally or optionally, UE 102 can support multiple radio access technologies (RATs) and can perform the search in all the RATs. This process can consume significant battery power. In example scenarios where higher priority PLMNs are not available in a particular area (e.g., since the network carrier uses different PLMN IDs in different areas), the battery drain involved in the HPPLMN searches can be substantial. Referring back to system 100, a home-network management component 104 can be employed to control the HPPLMN searches performed by the UE 102, while the UE 102 is roaming in a visitor network, though utilization of scan table(s) 106 and network ID list(s) 108 that are transferred to the UE 102 via communication networks 110 (e.g., the UE 102's home network). As an example, a scan table 106 can correspond to a specific radio access technology (RAT) (e.g., 2G, 3G, 4G LTE, 5G, narrowband, etc.). It is noted that the subject disclosure is not limited to tables and/or lists and most any data structure can be utilized to transfer and/or store information that is employed to control the HPPLMN searches.

According to an embodiment, when UE 102 is roaming and registers with a visitor network, the home-network management component 104 can detect the registration and transmit, to the UE 102, a prioritized/ranked network ID list(s) 108 (e.g., Operator Controlled PLMN) and scan table(s) 106 that are utilized by the UE 102 to control enabling and/or disabling the HPPLMN searches by modifying the periodicity of the searches according to the data within the scan control table(s) 106. As an example, the UE 102 can store the scan table(s) 106 and network ID list(s) 108 within a SIM (or USIM) card. In one aspect, the scan table(s) 106 comprises data, such as but not limited to, a single location area code (LAC) and/or tracking area code (TAC) and/or a range(s) of LAC/TACs. As an example, the single LAC/TAC and/or range of LAC/TACs are associated with network identifiers that have the highest priority in a particular region (e.g., state). Accordingly, if a LAC/TAC within the scan table(s) 106 is detected, the HPPLMN searches of the UE 102 are disabled. Alternatively, if a LAC/TAC within the scan table(s) 106 is not detected, the HPPLMN searchers of the UE 102 are enabled.

In one aspect, the UE 102 can read the received data (e.g., scan table(s) 106 and network ID list(s) 108) and can enable/disable HPPLMN scans based on comparing the serving cell information with the received data (e.g., scan table(s) 106). In another aspect, a roaming control applet installed on the SIM (or USIM) card of the UE 102 receives serving cell information from the UE 102, performs a comparison of the serving cell information with the received data (e.g., scan table(s) 106), and based on a result of the comparison can enable/disable an HPPLMN scan. In this example scenario, the UE 102 is not aware of the scan control data (e.g., scan table(s) 106) and can enable and/or disable the scans as instructed by the roaming control applet.

In one aspect, the scan table(s) 106 and/or network ID list(s) 108 can be transferred individually to specific UEs (e.g., UE 102) at most any time (e.g., when determined that the UE 102 is connected to a visitor network, when determined that the UE 102 is likely to travel to and/or connect to a visitor network, etc.). Further, in yet another example, the scan table(s) 106 and/or network ID list(s) 108 can be pre-loaded onto the SIM card or USIM card of the UE 102 (e.g., during manufacturing). It is noted that updates to the scan table(s) 106 and/or network ID list(s) 108 can be transmitted from the home-network management component 104 to the UE 102 at most any time, such as, but not limited to, periodically, at a specified times, during an idle time period, in response to determining that an event has occurred, on-demand, etc.

Figure 2:
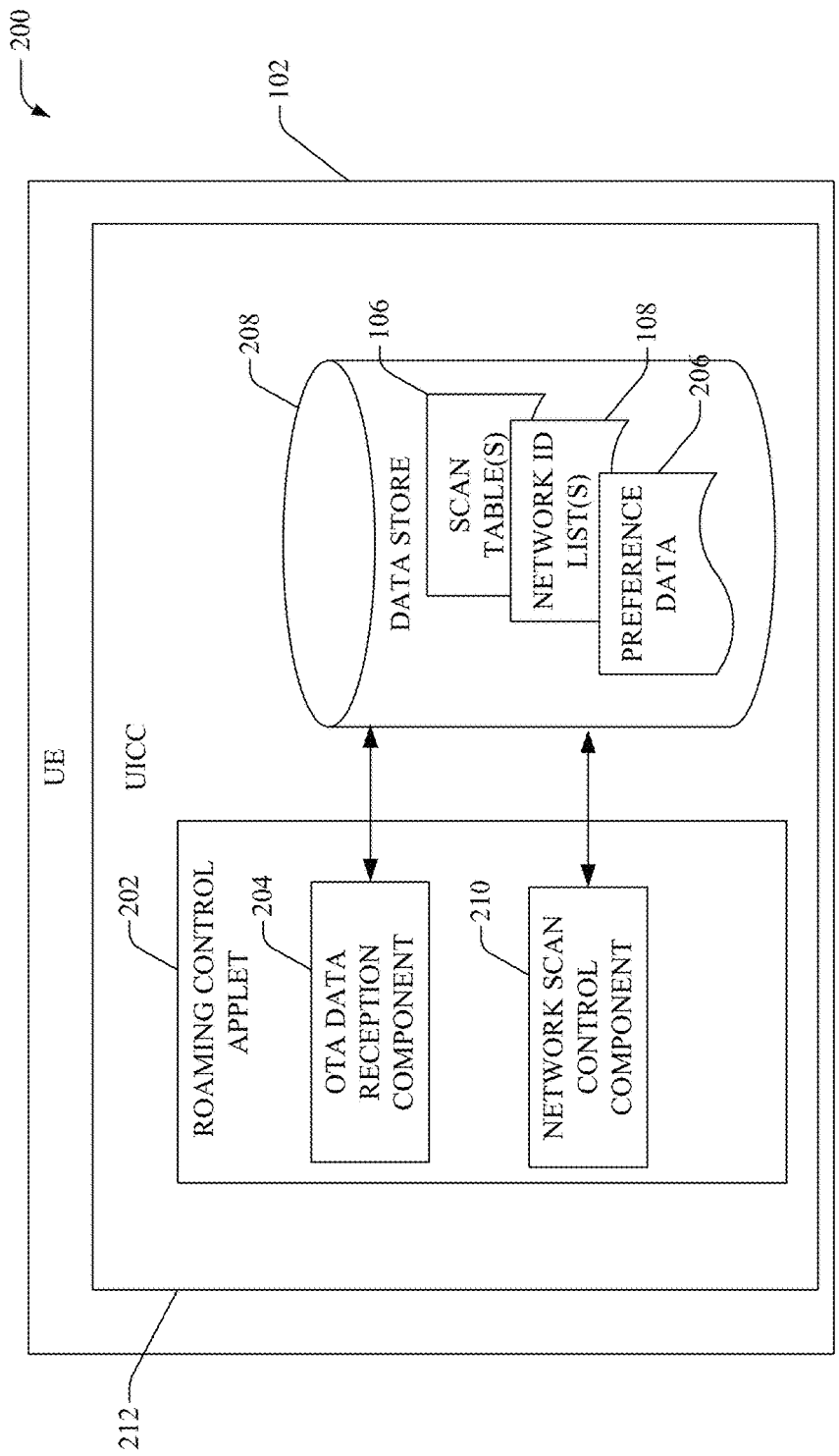
FIG. 2 illustrates an example system for controlling high priority public land mobile network (HPPLMN) searches in visitor networks.

Referring now to FIG. 2, there illustrated is an example system 200 for controlling HPPLMN searches in visitor networks, in accordance with an aspect of the subject disclosure. In one aspect, system 200 comprises UE 102 that comprises functionality as more fully described herein, for example, as described above with regard to system 100. UE 102 is 3GPP compliant device that comprises a roaming control applet 202, for example, installed by the device manufacturer on a Universal Integrated Circuit Card (UICC) 212.

In one aspect, the OTA data reception component 204 can receive (e.g., from the home-network management component 104) roaming control data, such as, but not limited to, the scan table(s) 106, network ID list(s) 108, preference data 206 (e.g., network selection policies, network selection rules, network selection criteria, priority information, and/or various other parameters, etc.). In one example, the OTA data reception component 204 can receive the data in response to the UE 102 connecting to and/or registering with a visitor network. It is noted that the subject disclosure is not limited to receiving data in response to the UE 102 connecting to and/or registering with the visitor network, but can receive the data (and/or updates to the data) at most any time. The OTA data reception component 204 can store the received data in data store 208.

According to an aspect, a network scan control component 210 can utilize the information stored in the data store 208 to manage scans (e.g., determine whether to perform a HPPLMN scan) to detect a higher priority network. Specifically, the network scan control component 210 can enable or disable HPPLMN searches performed by the UE 102 by modifying the periodicity of the searches based on a single LAC/TAC, a range(s) of LAC/TACs, an entire PLMN, and/or on a specific access technology basis. In one aspect, the network scan control component 210 can configure, based on the information, a value of a periodic search timer that controls a frequency of HPPLMN searches. For example, to enable the HPPLMN searches, the network scan control component 210 can set the periodic search timer to "N" (wherein N is most any natural number). Accordingly, the HPPLMN searches are enabled with a periodicity of N*6 minutes. In another example, to disable the HPPLMN searches, the network scan control component 210 can set the periodic search timer to "0". Accordingly, the HPPLMN searches are disabled regardless of the priority of the serving PLMN (e.g., even though the serving PLMN may not have the highest priority).

The periodic search timer does not affect the UE 102's ability to reselect between different RATs of the same PLMN. This can be controlled by the network's inter-RAT reselection parameters. In one aspect, the network scan control component 210 can utilize scan control table(s) 106 associated with respective RATs to control HPPLMN searches. As an example, the scan control table(s) 106 defines the LAC/TAC, ranges of LACs/TACs where the roaming control applet 202 is to disable searches. If the network scan control component 210 determines that the serving cell's LAC/TAC or PLMN is not listed within the one of the scan control table(s) 106, the network scan control component 210 can enable the HPPLMN searches. Alternatively, if the serving cell's LAC/TAC or PLMN is listed within the one of the scan control table(s) 106, the network scan control component 210 can disable the HPPLMN searches.

According to an embodiment, the UE 102 sends serving cell data, such as, but not limited to, a serving PLMN, LAC/TAC, Cell ID, and/or serving RAT messages, to the roaming control applet 202, for example, via a SIM Toolkit (STK) application programming interface (API). The roaming control applet 202 (e.g., via the network scan control component 210) compares received serving cell data with a corresponding RAT scan control table 106. If the data (or portion of the data) is determined to match, the network scan control component 210 disables HPPLMN searches. Alternatively, if the data does not match, the network scan control component 210 enables HPPLMN searches. This process can be repeated if the UE 102 moves to a new cell and/or area.

It is noted that the data store 208 can comprise volatile memory(s) or nonvolatile memory(s), or can comprise both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Figure 3A:
Figure 3B:
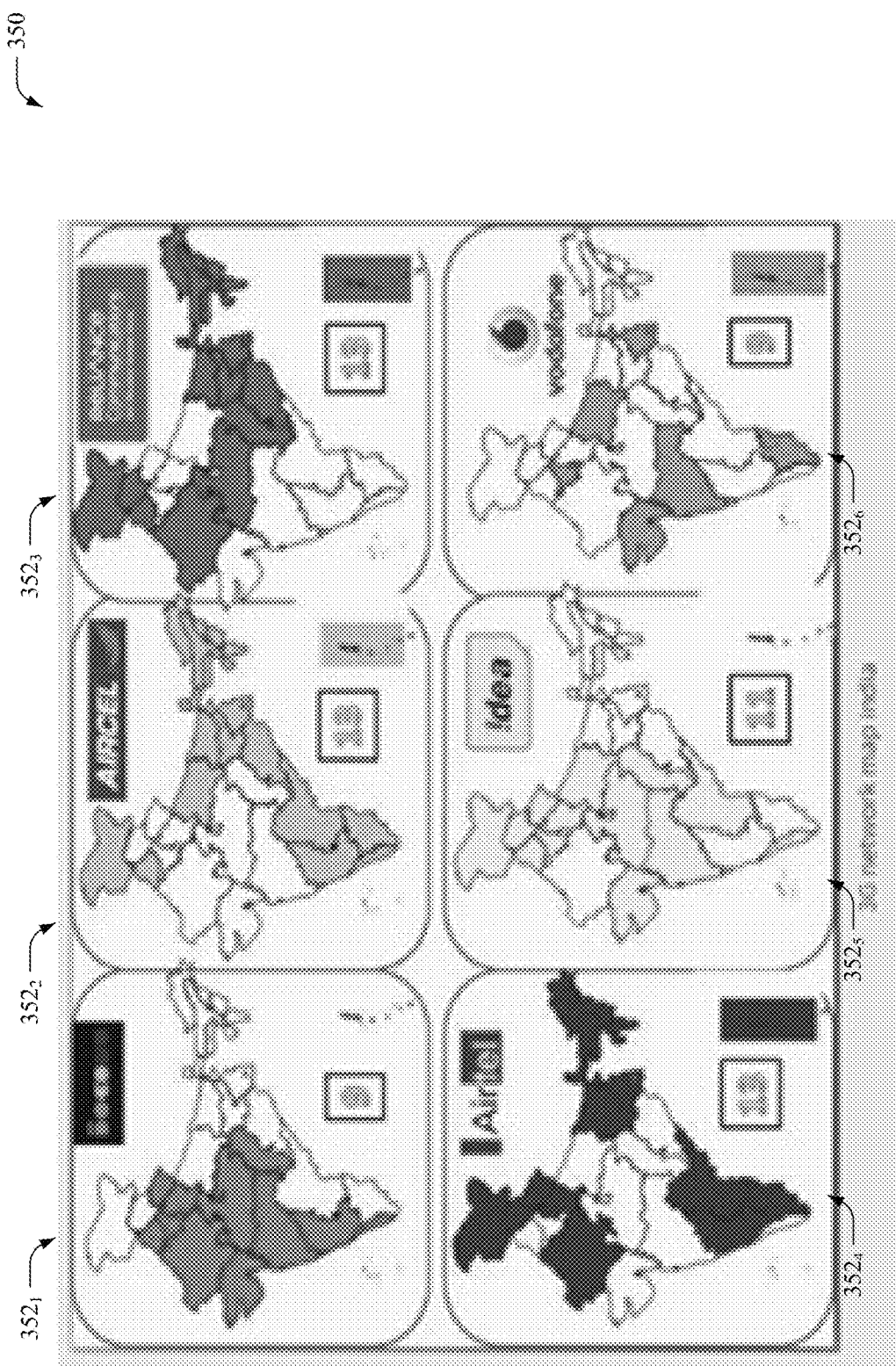

FIGS. 3A-3C illustrates an example carrier deployment model 300, wherein carriers utilize multiple network identifiers within a country, in accordance with an aspect of the subject disclosure. It is noted that although model 300 depicts a map of India, the subject disclosure is not so limited and can be utilized in most any country (or region) wherein carrier networks utilize multiple network identifiers (e.g., Hong Kong, Latvia, etc.) In the case of India, even though several carriers are deployed within the country, none of them has a nationwide footprint—their deployment model is based on a regional approach. India's telecom regulatory body has divided the country into regions called "Circles" or "service areas." The Circles are then broken down into groups based on population size. For example, the "Metro" circle 302 covers densely populated areas (e.g., large urban cities). Further, A Circle 304, B Circle 306, and C Circle 308 cover different geographical areas associated with different population sizes. For example, A Circle 304 can cover areas that are more populated than the B Circle, which can cover areas that are more populated than the C Circle. In general, each Circle roughly corresponds to a state with some exceptions (e.g., densely populated cities form their own circles (Metro) or less populated states can be combined together, or with larger states, to form a circle). Each Circle can have one or more carriers. According to an aspect, a network carrier can be assigned different PLMN IDs within the different circles.

FIG. 3B depicts an example 3G map 350 of India, illustrating coverage maps ($352_1$-$352_6$) for different carriers. As seen from FIG. 3B, the carriers may not provide nationwide coverage but provide coverage within different Circles. Each carrier can utilize different PLMN IDs within each Circle as depicted in FIG. 3C. When a UE registers with a visitor carrier within a country, such as India, the registration is detected by the home carrier network (e.g., within another country, such as, USA) and a priority list 377 that ranks the different PLMN IDs and one or more scan tables (e.g., scan tables 106) are sent to the UE. The example PLMN list 377 (e.g., network ID list 108) can comprise a set of PLMN IDs utilized by the different carriers and their respective priorities. For example, the carrier "Aircel" utilizes PLMN IDs 404-800, 405-81, and 404-41. However, as seen from 379, not all the PLMN IDs are available within the same region. For example, PLMN ID 404-800 is broadcast only in Delhi, PLMN ID 405-81 is broadcast only in Andhra Pradesh and Telangana, while PLMN ID 404-41 is broadcast only in Chennai. Accordingly, not all of the higher priority PLMNs may be available at the UE's current location. According to an embodiment, the UE can utilize the scan tables (e.g., scan table(s) 106 discussed in detail with respect to herein, for example with respect to systems 100-200) to avoid searching for an HPPLMN that would not be available within the UE's current location.

Figure 4:
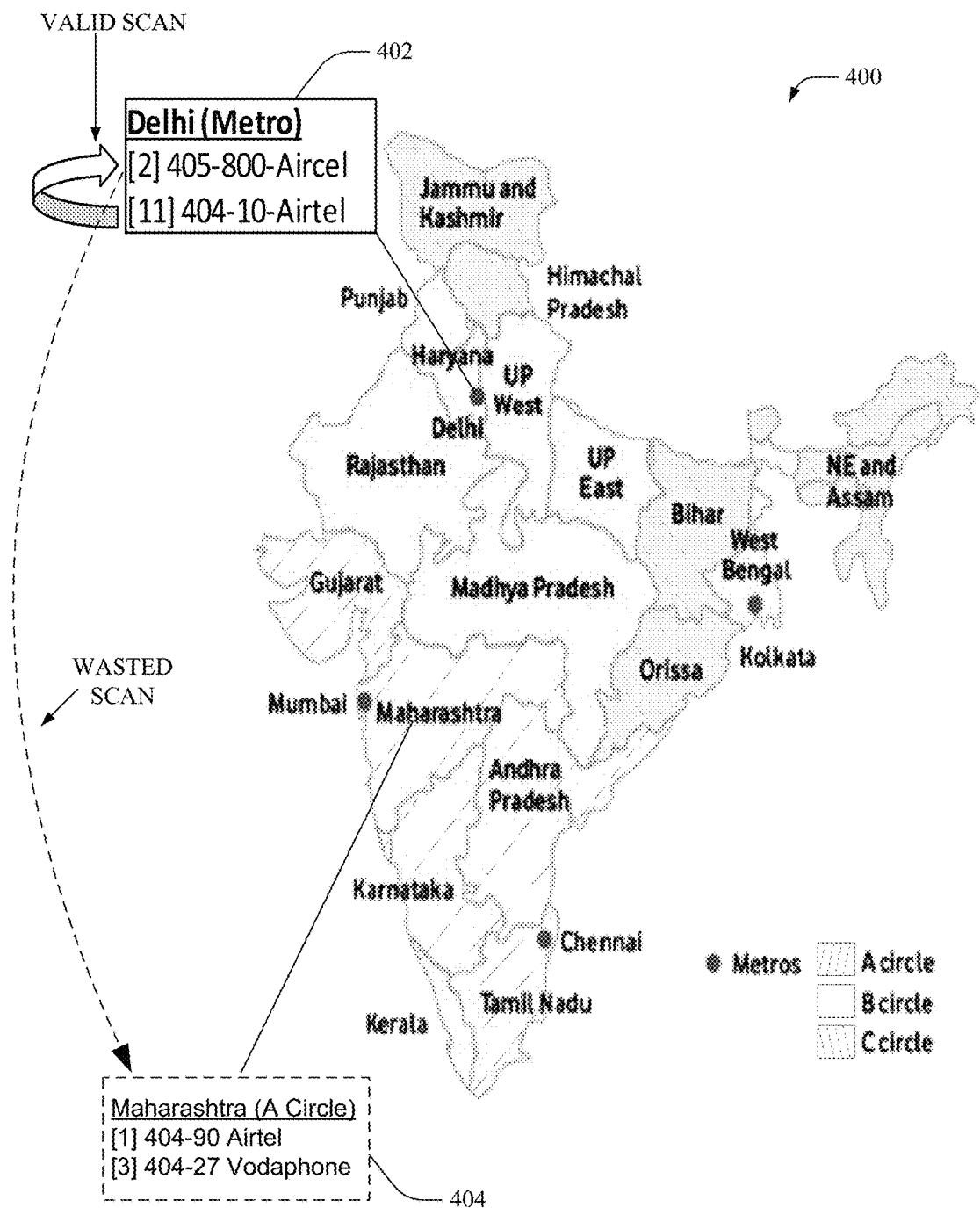
FIG. 4 illustrates an example HPPLMN scan scenario, according to an aspect of the subject disclosure.

Referring now to FIG. 4, there illustrated is an example HPPLMN scan scenario 400, according to an aspect of the subject disclosure. In one aspect, when a UE registered with a home network in another country (e.g., USA) travels to India (or any other country/region that utilizes different PLMN IDs within different coverage areas), the UE can receive an OTA message to update a file (e.g., OPLMNAcT file) stored within the UICC of the UE. In one example, the message comprises a ranked list of PLMN IDs (e.g., ranked based on home service provider policies and/or service agreements). Typically, the same ranked list sent to all roaming UEs regardless of where they first register in India.

Consider an example scenario, wherein a UE is located in the Delhi metro circle and registers on Airtel ([11] 404-10). In this example scenario, at 402, the UE can periodically rescan and ultimately find a network with a higher priority (e.g., Aircel ([2] 404-800) as specified by the priority list 377. Since this is not the highest priority Indian network on the list 377, a conventional UE would continue to search for [1] 404-90 (Airtel) (as depicted by the dotted lines and element 404). However, [1] 404-90 (Airtel) is not an available network at the UE's current location and only available in a different geographical area (e.g., Circle). Conventional UEs perform an HPPLMN search frequently, for example, every 6 minutes, resulting in a significantly degraded battery life of the UE.

In another example, scenario, consider a UE located in the state of Punjab registers on Airtel ([9] 404-2). Conventionally, the UE will periodically rescan searching for [1] 404-90 (Airtel) since it is not on its highest priority Indian network as specified by list 377. However, 404-90 is not available in Punjab and is only available in a different Circle (e.g., state of Maharashtra). These periodic rescans for networks that are not available in the UE's current geographical location can significantly degrade its battery life. Referring to the example list 377, when registered anywhere in India except in Maharashtra on Airtel ([1] 404-90), conventional UEs would be in a state of constant periodic higher priority PLMN searches. In contrast, the UE disclosed herein (e.g., UE 102) avoids unnecessary scanning for unavailable and/or non-existing networks by employing one or more RAT based scan tables (e.g., scan table(s) 106). According to an aspect, the one or more RAT based scan tables can be populated with highest priority preferred PLMN ID of a carriers on a Circle (or other geographical area) basis. The UE 102 comprises a roaming control applet 202 that controls the enabling and/or disabling of the HPPLMN searches by modifying the periodicity of the searches. As an example, each of the RAT based scan control tables defines a LAC/TAC and/or ranges of LACs/TACs where the roaming control applet 202 is to disable HPPLMN searches.

Referring back to FIG. 4 and continuing with the example scenario at 402, wherein the UE 102 can periodically rescan and ultimately couple to the Aircel network. The UE 102 can then provide serving cell data (e.g., serving PLMN, LAC/TAC, Cell ID, and/or serving RAT messages) to the roaming control applet 202, which in turn can compare the serving cell data with the LAC/TAC and/or ranges of LACs/TACs specified within a corresponding RAT based scan control table. If the roaming control applet 202 determines that the serving cell LAC/TAC matches the LAC/TAC and/or is within the ranges of LACs/TACs specified within the corresponding RAT based scan control table, subsequent HPPLMN scans (e.g., a scan to detect Airtel ([1] 404-90) at 404) can be disabled. Alternatively, if the serving cell LAC/TAC does not match the LAC/TAC and/or does not lie within the ranges of LACs/TACs specified within the corresponding RAT based scan control table, subsequent HPPLMN scans can be enabled and the UE 102 can continue to search for a HPPLMN.

As an example, if HPPLMN are to be disabled when the UE 102 is coupled to the [2] 405-800 2G and 3G Aircel network, but not on their LTE network in Delhi, the RAT based scan control tables can be populated as follows:
2G Scan Control Table=405-800-0000-FFFE
3G Scan Control Table=405-800-0000-FFFE
4G Scan Control Table=no entry
Where 0000 is a starting LAC/TAC value of the range and FFFE is the ending LAC/TAC value of the range.

FIG. 5 illustrates an example table 500 for configuring a scan control data (e.g., scan control table 106), according to an aspect of the subject specification. In one aspect, scan control tables can be populated by a home network provider (and/or updated by the home network provider at most any time). This allows the home network provider control over visitor network selection by the UE (e.g., based on operator policies and/or defined service agreements between the home network provider and the visitor network provider(s)).

As depicted in table 500, scan control tables can be populated with the highest priority preferred PLMN ID deployed in each Circle (or region). For example, Aircel 405-800, is the highest priority PLMN ID in the Delhi metro, and thus, the PLMN ID (405-800) can be entered into the scan table. In another example, Vodafone 404-27 is not the highest priority PLMN ID in the state of Maharashtra (Airtel 404-90 being the highest priority PLMN in Maharashtra). Accordingly, the PLMN ID for Vodafone 404-27 is not entered within the scan control table to allow UEs to scan for and detect Airtel 404-90, which has a higher rank and is available in the state of Maharashtra.

In one aspect, for Circles that have a single preferred PLMN, the ID of the single preferred PLMN can be stored within the scan control table. In another aspect, for Circles that have multiple preferred PLMNs, the ID of the PLMN having the highest priority can be stored within the scan control table.

It is noted that although the systems and methods disclosed herein relate to "Circles" that have utilize different PLMN IDs for a carrier, the subject system is not limited to "Circles" and can be within geographical areas or regions of most any shape or size that utilize different network IDs for a carrier. Further, it is noted that although the subject systems and methods disclosed herein are described with respect to visitor networks in India, the subject system is not limited to India and can be utilized in any other country or region wherein multiple network IDs are utilized for respective visiting networks. In one aspect, the systems and methods disclosed herein can further be utilized in Mobile Virtual Network Operator (MVNO) carriers. As an example, the UE's of the MVNO can be provided with scan control tables (e.g., scan control table 106) to prevent the UE's from searching for non-existing and/or unavailable carriers (e.g., discontinued mobile network codes (MNCs)). For example, even though the MNC range for Carrier A is is 310-150, following the acquisition of Carrier A by Carrier B, the UEs of Carrier A roam on a 310-410 network of Carrier B. The scan table(s) can be provided to the UEs, which in turn can utilize the data within the scan table(s) to turn off HPPLMN scans when coupled to a 310-410 carrier. (e.g., since the 310-150 PLMN has been discontinued and is not being broadcast).

FIGS. 6-9 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 6:
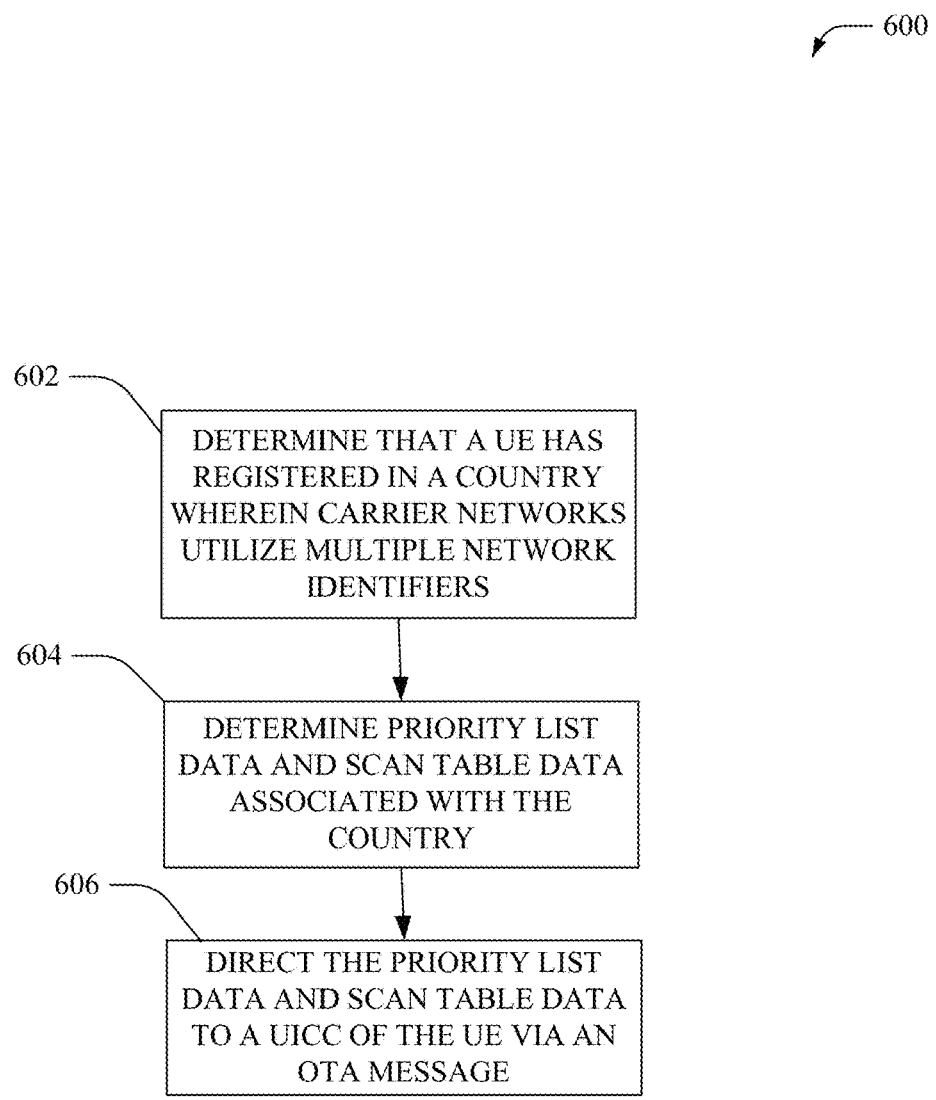
FIG. 6 illustrate an example method that facilitates providing, to a UE coupled to a visitor network, information that is employable to control searches for higher priority network identifiers.

Referring now to FIG. 6 there illustrated is an example method 600 that facilitates providing, to a UE coupled to a visitor network, information that is employable to control searches for higher priority network identifiers, according to an aspect of the subject disclosure. In an aspect, method 600 can be implemented (partially or completely) by one or more network devices of the UE's home network. At 602, it can be determined that the UE has registered in a country (e.g., India) wherein carrier networks utilize multiple network identifiers (e.g., PLMNs). For example, a carrier networks can utilize different PLMNS (or ranges of PLMNs) in different areas (e.g., Circles) within the country. At 604, priority list data and scan table data associated with the country can be determined. For example, the priority list data can comprise a ranked list of PLMN identifiers utilized by the different carriers. Further, the scan table data can comprise PLMN IDs of the preferred carriers that have the highest rank within a specified area (e.g. Circle). In one example, the same priority list data and scan table data can be provided to all UEs that register with the visitor network. Alternatively, in another example, the priority list data and scan table data can be customized based on information, such as but not limited to, subscriber data, payment plans, UE characteristics, historical trends, patterns, etc. At 606, the priority list data and scan table data can be transferred to aUICC of the UE via an OTA message. As an example, the data is stored within a file on the SIM/USIM (and/or update an existing file on the SIM/USIM with the priority list data and scan table data). In one aspect, the scan table data can be utilized to control priority-based network identifier searches performed by the UE while roaming within the country.

Figure 7:
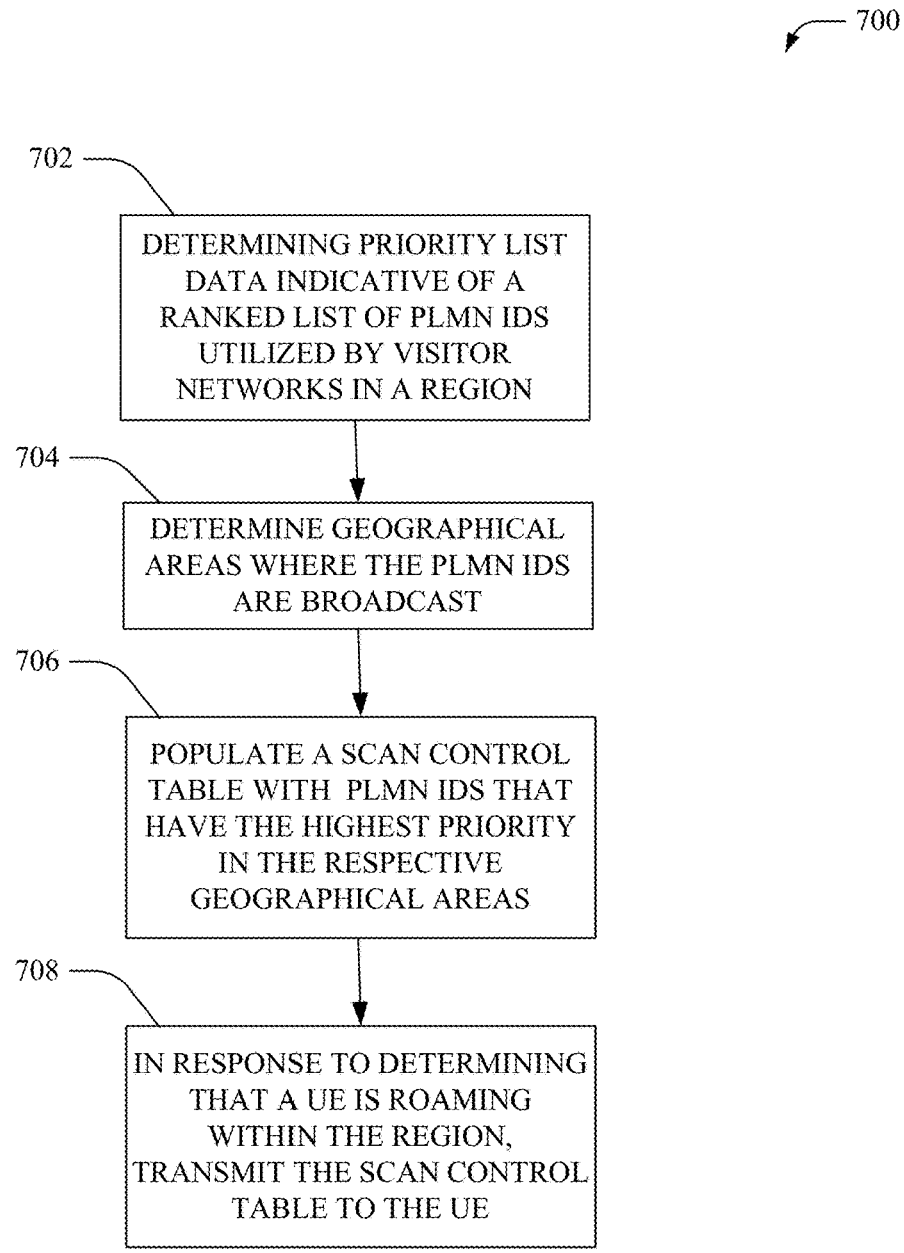
FIG. 7 illustrates an example method that facilitates configuration of a scan control table.

I added FIGS. 13a and 13b to show how the roaming control applet works. FIG. 13a shows the case where the applet needs to disable the scans and FIG. 13b shows the case where the applet needs to re-enable the scans FIG. 7 illustrates an example method 700 that facilitates configuration of a scan control table, according to an aspect of the subject disclosure. In an aspect, method 700 can be implemented (partially or completely) by one or more network devices of a UE's home network. At 702, priority list data indicative of a ranked list of PLMN IDs utilized by visitor networks in a region (e.g., a country) is determined. As an example, the ranking can be based on home network provider policies and/or roaming service agreements between the home network provider and the visitor network providers. At 704, geographical areas where the PLMN IDs are broadcast can be determined. In one aspect, the visitor networks can broadcast different PLMN IDs in different areas (e.g., Circles). At 706, a scan control table can be populated with PLMN IDs that have the highest priority/rank within the respective geographical areas. Further, at 708, in response to determining that a UE is roaming within the region, the scan control table can be transmitted to the UE (e.g., via one or more OTA messages). In one aspect, the UE can utilize the scan control table to control HPPLMN searches while roaming in the region.

Figure 8:
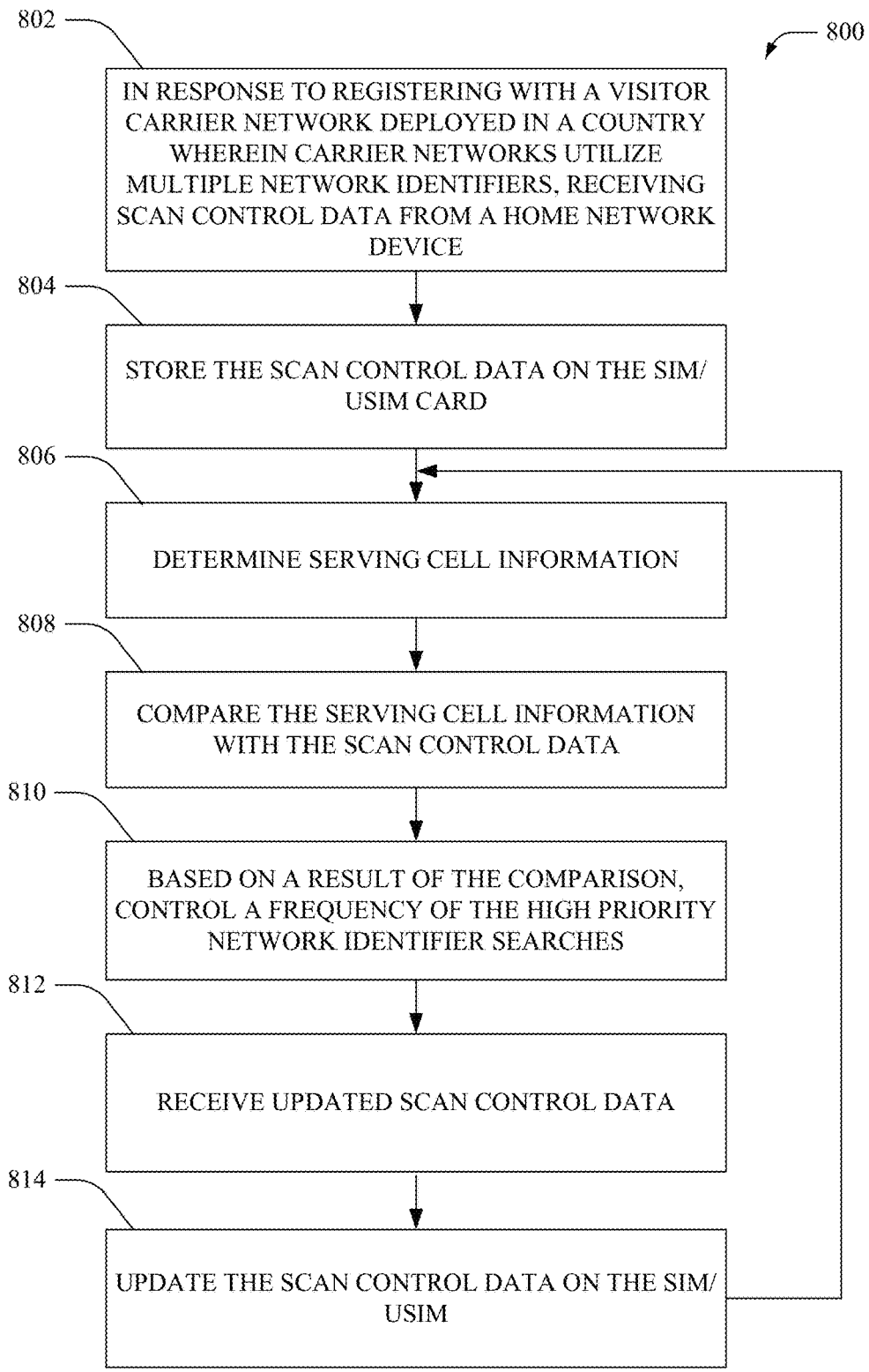
FIG. 8 illustrates an example method that facilitates controlling a frequency of network identifier scans in a visitor priority public land mobile network (VPLMN).

Referring now to FIG. 8 there illustrated is an example method 800 that facilitates controlling a frequency of network identifier scans in a VPLMN, according to an aspect of the subject disclosure. In an aspect, method 800 can be implemented (partially or completely) by a UE that is coupled to a visitor network. At 802, scan control data is received from a home network device in response to the UE registering with the visitor carrier network deployed in a country (or region) wherein carrier networks utilize multiple network identifiers (e.g., PLMN IDs). At 804, the scan control data can be stored on the SIM/USIM card (e.g., within an OPLMNAct file). At 806, serving cell information can be determined. For example, on connection to a visitor network (or at most any other time), the UE can provide the serving cell information (e.g., serving PLMN, LAC/TAC, Cell ID, serving RAT messages, etc.) to the SIM/USIM card. At 808, the serving cell information can be compared with the scan control data (e.g., by employing a roaming control application). Further, at 810, a frequency of high priority network identifier searches can be controlled based on a result of the comparison. For example, HPPLMN searches can be enabled or disabled based on the result of the comparison.

At 812, updated scan control data can be received, for example from the home network device. As an example, the scan control data can be updated based on network provider preferences, policies, and/or service agreements. At 814, the scan control data on the SIM/USIM can be updated based on the updated scan control data. The method can continue to control high priority network identifier searches based on the updated scan control data.

Figure 9:
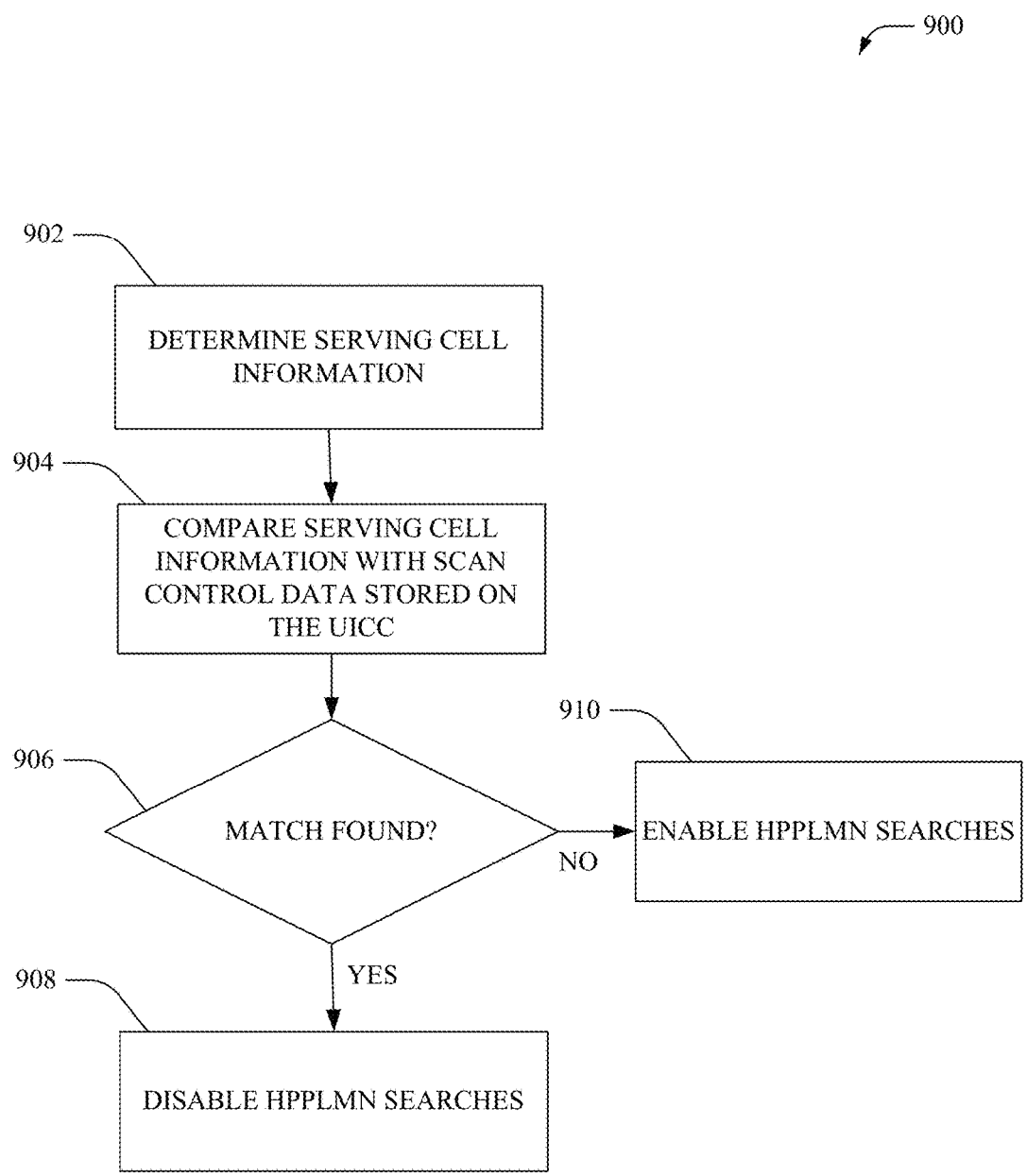
FIG. 9 illustrates an example method that controls HPPLMN searches in a VPLMN.

FIG. 9 illustrates an example method 900 that controls HPPLMN searches in a VPLMN, according to an aspect of the subject disclosure. In an aspect, method 900 can be implemented (partially or completely) by UICC application(s) of a UE. At 902, serving cell information can be determined. As an example, the serving cell information can comprise, but is not limited to, serving PLMN, LAC/TAC, Cell ID, serving RAT messages, etc. At 904, the serving cell information is compared with scan control data (e.g., a scan control table corresponding to the serving cell RAT) stored on the UICC. At 906, it can be determined whether the serving cell information matches the scan control data (e.g., whether the serving PLMN matches a PLMN ID listed in the scan control table). If determined that the serving cell information matches the scan control data, then at 908, HPPLMN searches can be disabled. Alternatively, if determined that the serving cell information does not match the scan control data, then at 910, HPPLMN searches can be enabled and the UE can continue to periodically scan for PLMNs that have a higher priority than the serving PLMN.

Figure 10A:
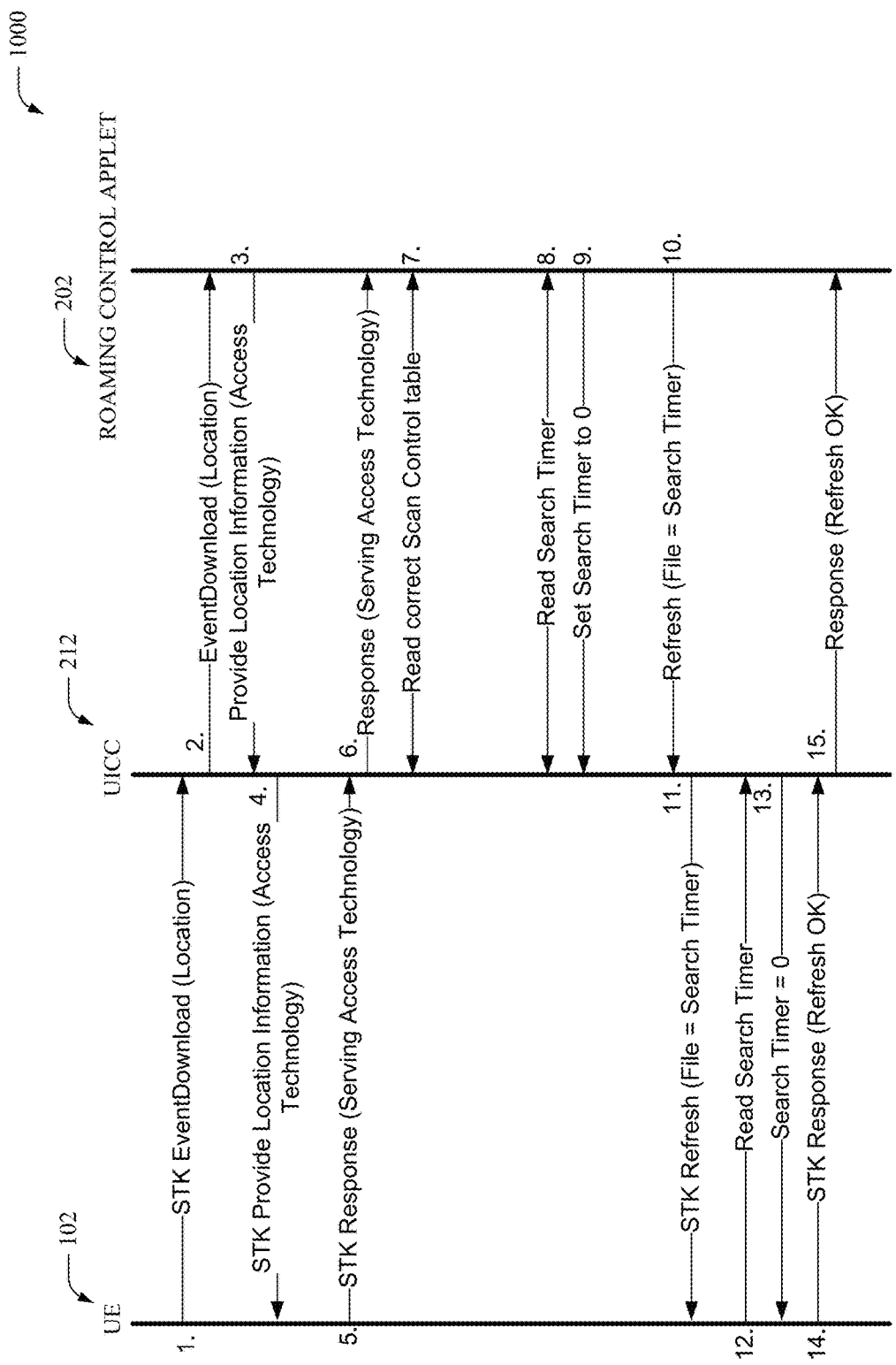
FIGS. 10A-10B illustrate example flow diagrams for controlling HPPLMN searches in visitor networks.
Figure 10B:
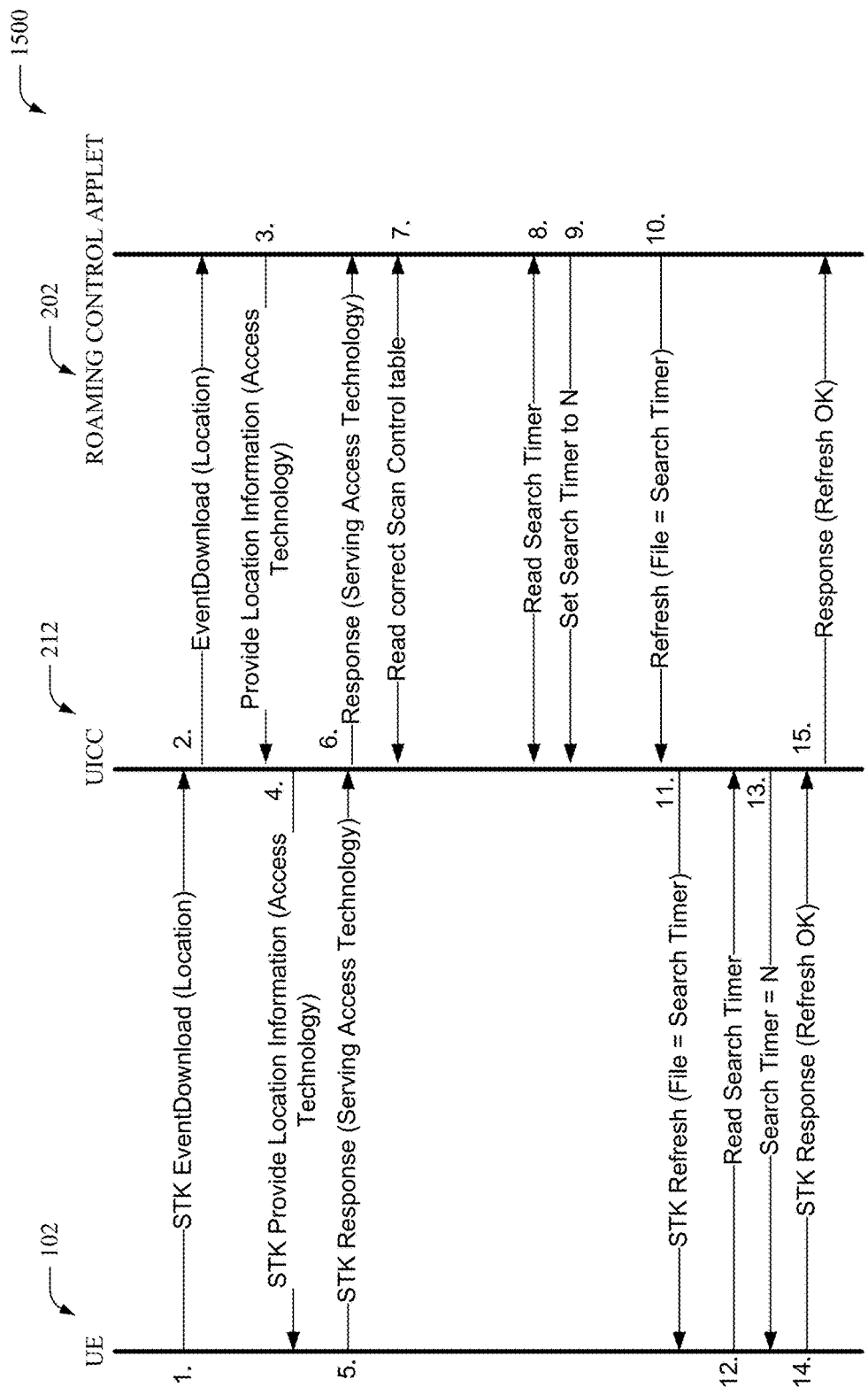

FIGS. 10A-10B illustrate example flow diagrams 1000 and 1500 for controlling HPPLMN searches in visitor networks. It is noted that the UE102, roaming control applet 202, and UICC 212 can include respective functionality, as more fully described herein, for example, with regard to systems 100-200. Example flow diagram 1000 facilitates disabling HPPLMN searches. At 1, a SIM toolkit (STK) event download message can be sent from UE 102 to the UICC 212 and at 2, the UICC 212 can forward the STK event download message to the roaming control applet 202. In one aspect, the roaming control applet 202 can determine the access technology information. At 3 and 4, the access technology information can be provided to the UE 102 via the UICC 212. At 5, the UE 102 can provide the serving access technology data (e.g., access technology of the serving cell) to the UICC 212, which in turn can forward the serving access technology data to the roaming control applet 202 (at 6). Further, at 7, the roaming control applet 202 can read the correct scan control table (e.g., scan control table 106) (e.g., selected based on the access technology of serving cell). Furthermore, the roaming control applet 202 can compare the serving access technology data (e.g., serving cell PLMN) with LAC/TACs within an appropriate scan control table (e.g., scan control table 106). If a match is found and a search timer (e.g., read from the UICC at 8) is not already set to "0," then at 9, the roaming control applet 202 sets the search timer to "0". If the search timer is already "0" then the roaming control applet 202 does nothing. In this example scenario, the search timer to "0" (at 9) and accordingly, at 10-11, the roaming control applet 202 notifies the UE 102 that the value of the search timer has been changed. At 12-13, the UE 102 reads the search timer value and on determining that the search timer is set to "0", the UE 102 can disable HPPLMN rescans. At 14-15, the UE 102 sends a refresh OK response to the roaming control applet 202.

Example flow diagram 1500 facilitates enabling HPPLMN searches. At 1, a SIM toolkit (STK) event download message can be sent from UE 102 to the UICC 212 and at 2, the UICC 212 can forward the STK event download message to the roaming control applet 202. In one aspect, the roaming control applet 202 can determine the access technology information. At 3 and 4, the access technology information can be provided to the UE 102 via the UICC 212. At 5, the UE 102 can provide the serving access technology data (e.g., access technology of the serving cell) to the UICC 212, which in turn can forward the serving access technology data to the roaming control applet 202 (at 6). Further, at 7, the roaming control applet 202 can read the correct scan control table (e.g., scan control table 106) (e.g., selected based on the access technology of serving cell). Furthermore, the roaming control applet 202 can compare the serving access technology data (e.g., serving cell PLMN) with LAC/TACs within an appropriate scan control table (e.g., scan control table 106). If a match is not found and a search timer (e.g., read from the UICC at 8) is not already set to "N" (where N is most any natural number), then at 9, the roaming control applet 202 sets the search timer to "N". If the search timer is already "N" then the roaming control applet 202 does nothing. In this example scenario, the search timer to "N" (at 9) and accordingly, at 10-11, the roaming control applet 202 notifies the UE 102 that the value of the search timer has been changed. At 12-13, the UE 102 reads the search timer value and on determining that the search timer is set to "N", the UE 102 can enable HPPLMN rescans. At 14-15, the UE 102 sends a refresh OK response to the roaming control applet 202.

Figure 11:
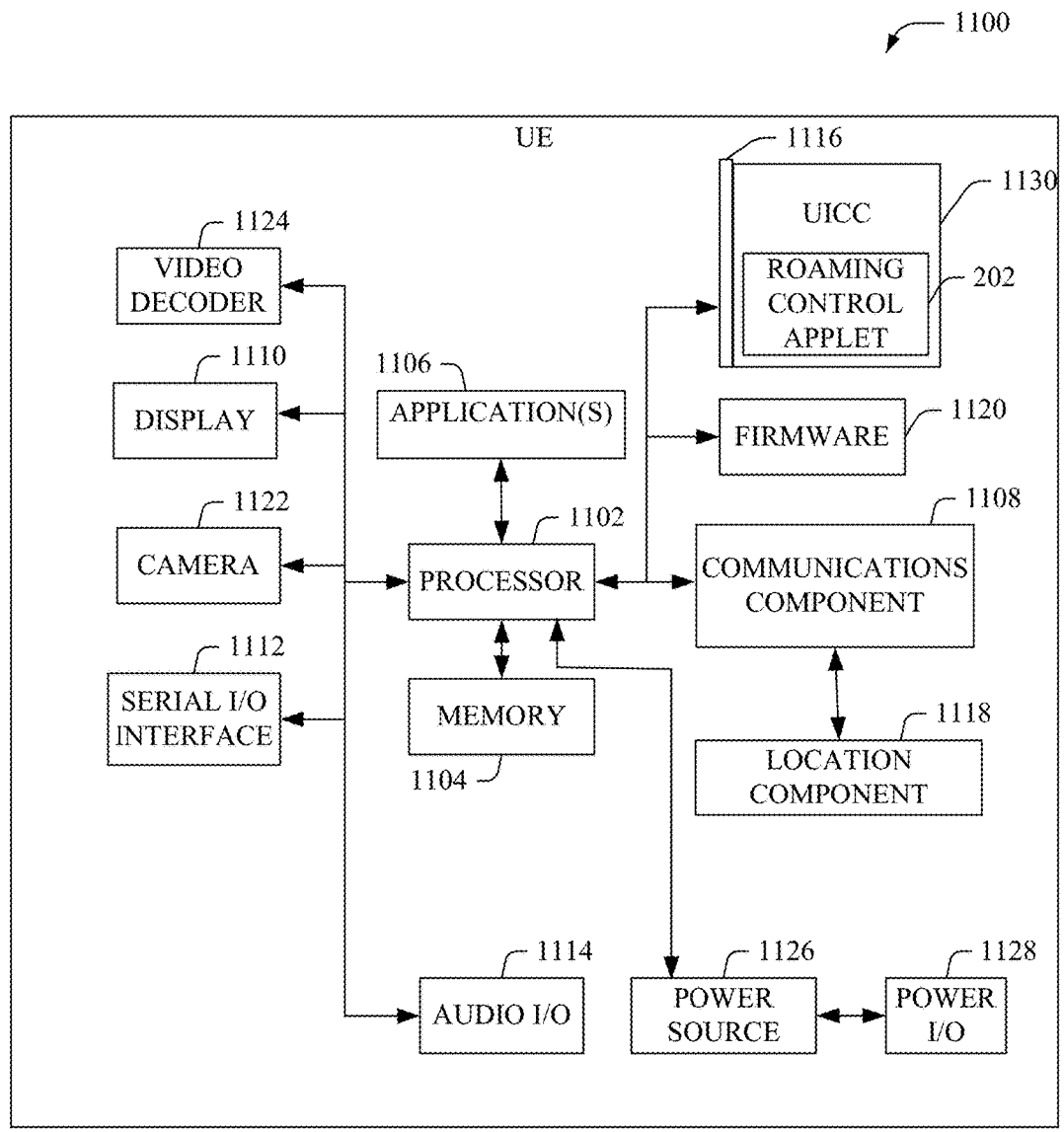
FIG. 11 illustrates an example block diagram of a user equipment suitable for controlling HPPLMN scans to conserve battery life.

Referring now to FIG. 11, there is illustrated a block diagram of a UE 1100 that facilitates a controlling HPPLMN scans to conserve battery life in accordance with the subject specification. UE 1100 can be substantially similar to UE 102 and can include respective functionality, as more fully described herein, for example, with regard to systems 100-200. In one aspect, the UE 1100 can include a processor 1102 for controlling all onboard operations and processes. A memory 1104 can interface to the processor 1102 for storage of data and one or more applications 1106 being executed by the processor 1002. A communications component 1108 can interface to the processor 1102 to facilitate wired/wireless communication with external systems (e.g., network data storage, cloud network devices, etc.). The communications component 1108 can interface to a location component 1118 (e.g., GPS transceiver) that can facilitate location detection of the UE 1100.

The UE 1100 can include a display 1110 (e.g., screen and/or touch screen) for displaying the media objects, received content (and/or content to be transferred) and/or for displaying text information related to operating and using the device features. A serial I/O interface 1112 is provided in communication with the processor 1102 to facilitate serial communication (e.g., USB, and/or IEEE 1394) via a hardwire connection. Audio capabilities are provided with an audio I/O component 1114, which can include a speaker for the output of audio signals related to, for example, the audio files, recorded data or telephony voice data, and a microphone for inputting voice signals for recording and/or telephone conversations.

Further, the UE 1100 can include a slot interface 1116 for accommodating a UICC 1130 (e.g., a SIM or USIM card). The UICC 1030 can be substantially similar to UICC 212 and can include respective functionality, as more fully described herein, for example, with regard to system 200. In an aspect, the UICC 1030 can comprise the roaming control applet 202 that controls HPPLMN searches. According to an aspect, the roaming control applet 202 can enable or disable HPPLMN searches based on scan control data received from the UE 1100's home network provider. The roaming control applet 202 can include respective functionality, as more fully described herein, for example, with regard to system 200. Firmware 1120 is also provided to store and provide to the processor 1102 startup and operational data. The UE 1100 can also include a media capture component 1122 such as a camera and/or a video decoder 1124 for decoding encoded multimedia content. Further, the UE 1100 can include a power source 1126 in the form of batteries, which power source 1126 interfaces to an external power system or charging equipment via a power I/O component 1128.

Figure 12:
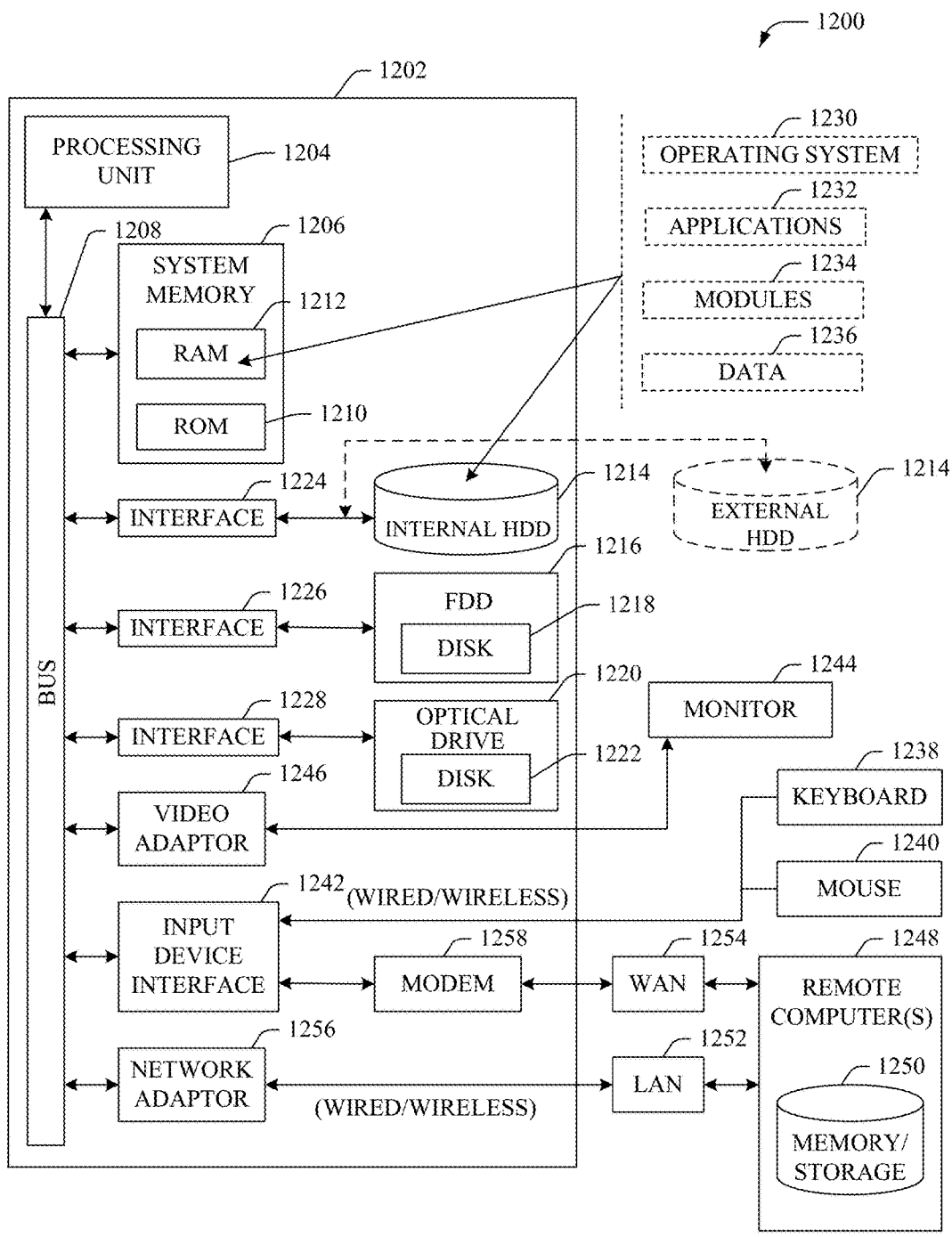
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), application(s) server(s), equipment, system(s), interface(s), gateway(s), controller(s), node(s), engine(s) and/or device(s) (e.g., UE 102, home-network management component 104, OTA data reception component 204, network scan control component 210, UE 1000, etc.) disclosed herein with respect to systems 100-200, and 1000 can each comprise at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least Wi-Fi and Bluetooth™ wireless technologies or other communication technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRDRAM). Additionally, the disclosed memory components of systems or methods herein are intended to comprise, without being limited to comprising, these and any other suitable types of memory.

Figure 13:
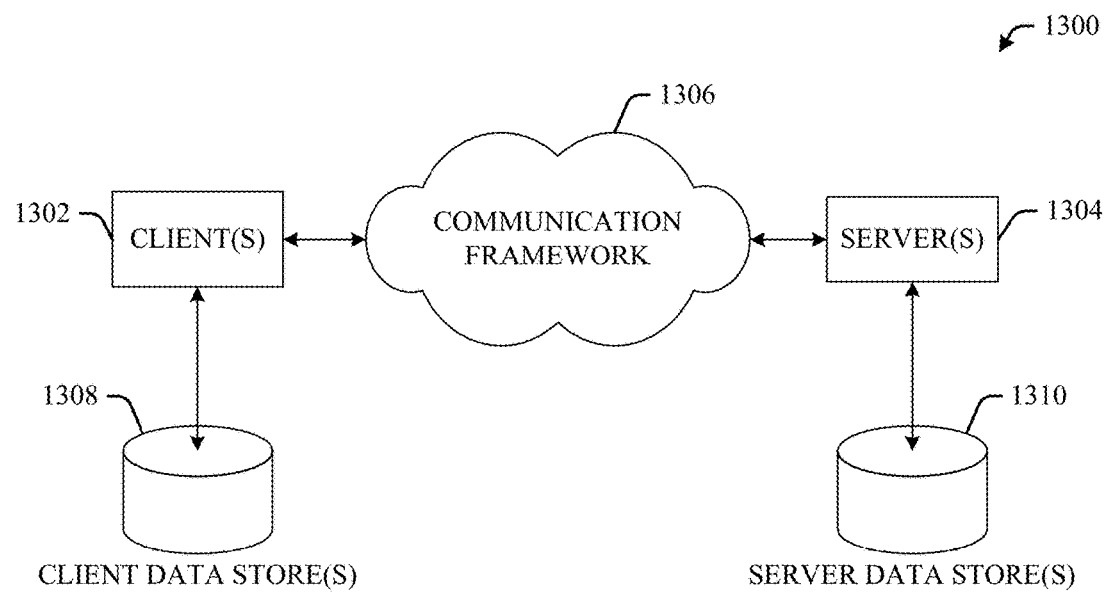
FIG. 13 illustrates a schematic block diagram of a computing environment in accordance with the subject specification.

Referring now to FIG. 13, there is illustrated a schematic block diagram of a computing environment 1300 in accordance with the subject specification. The system 1300 comprises one or more client(s) 1302. The client(s) 1302 can be hardware and/or software (e.g., threads, processes, computing devices).

The system 1300 also comprises one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may comprise a cookie and/or associated contextual information, for example. The system 1300 comprises a communication framework 1306 (e.g., a global communication network such as the Internet, cellular network, etc.) that can be employed to facilitate communications between the client(s) 1302 and the server(s) 1304.

Communications can be facilitated via a wired (comprising optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user equipment, comprising:
   a processor; and
   a memory that stores executable instructions that, when executed by the processor, facilitate performance of operations, comprising:
      in response to determining that the user equipment is roaming within a country where visitor networks are associated with multiple network identifiers and where visitor devices of a visitor network, of the visitor networks, broadcast different network identifiers for the visitor network in different portions of the country determining priority data that comprises a first list of the multiple network identifiers with their respective rankings and determining scan control data that is employable to reduce a frequency of scans for a target cell when the user equipment is located within a portion of the different portions, based on determining network identifiers of the different network identifiers that are not being broadcast within the portion, wherein the scan control data comprises a second list of a group of the different network identifiers selected from the first list, and wherein the group of the different network identifiers are determined to have highest ranks within the different portions;
      in response to determining, based on the priority data, that a serving network identifier, associated with a visitor network device, of the visitor network devices, that is serving the user equipment, does not satisfy a high rank criterion, comparing the serving network identifier with the scan control data; and
      in response to determining that the scan control data comprises the serving network identifier, reducing the frequency of scans for the target cell that has a target cell identifier that is determined to have a higher rank than the serving network identifier.

2. The user equipment of claim 1, wherein the determining the scan control data comprises receiving the scan control data from a home network device of a home network.

3. The user equipment of claim 2, wherein the receiving comprises receiving the scan control data via an over-the-air message.

4. The user equipment of claim 2, wherein the operations further comprise:
   storing the scan control data within a universal integrated circuit card of the user equipment.

5. The user equipment of claim 1, wherein the determining that the user equipment is roaming within the country comprises determining that the user equipment has registered with a visitor public land mobile network identifier associated with the country.

6. The user equipment of claim 1, wherein the operations further comprise:
   in response to determining that the scan control data does not comprise the serving network identifier, facilitating the scans for the target cell identifier.

7. The user equipment of claim 1, wherein the reducing the frequency comprises disabling the scans.

8. The user equipment of claim 1, wherein the scan control data is associated with a defined radio access technology.

9. The user equipment of claim 1, wherein the group of different network identifiers comprises different public land mobile network identifiers.

10. A method, comprising:
   determining, by a system comprising a processor, that a user equipment has registered with a visitor network device of visitor network devices associated with a visitor network deployed in a country, wherein the visitor network devices broadcast different network identifiers for the visitor network in different portions of the country; and
   in response to the determining, facilitating, by the system, a first transmission of priority data and a second transmission of scan control data to the user equipment, wherein the priority data comprises respective priorities of network identifiers utilized within the country, wherein the scan control data is determined based on determining network identifiers of the different network identifiers that are not available within the portion, wherein the scan control data comprises information indicative of a group of the network identifiers, selected from the priority data, that are determined to have highest ranks within the different portions, and wherein the scan control data is employable to control a frequency of searches, performed by the user equipment, for detecting, based on the priority data, a first network identifier of the different network identifiers that has been assigned a higher priority than a second network identifier of a cell serving the user equipment.

11. The method of claim 10, wherein the facilitating comprises facilitating the transmission via an over-the-air message.

12. The method of claim 10, further comprising:
   based on the priority data and location data indicative of respective areas of the country where the different network identifiers are broadcast, determining, by the system, the scan control data.

13. The method of claim 12, further comprising:
   instructing, by the system, the user equipment to disable the searches based on the scan control data.

14. The method of claim 12, further comprising:
   instructing, by the system, the user equipment to enable the searches based on the scan control data.

15. The method of claim 10, wherein the scan control data is employable to control the frequency of the searches via a roaming control applet installed within a universal integrated circuit card of the user equipment.

16. A non-transitory machine-readable storage medium, comprising executable instructions that, when executed by a processor of a user equipment, facilitate performance of operations, comprising:
   receiving priority data indicative of a ranking of network identifiers of visitor carrier networks within a country, wherein the priority data is employable to couple the user equipment with a first access point device associated with a first identifier of the network identifiers that is determined to have a first ranking that satisfies a defined criterion;
   as a function of determining that visitor devices of a visitor carrier network, of the visitor carrier networks, broadcast different network identifiers for the visitor carrier network in different portions of the country, receiving scan control data that comprises information representing a first group of the network identifiers, selected from the priority data, that are determined to have highest ranks within the different portions, wherein scan control data that is employable to reduce a frequency of scans for a target cell when the user equipment is located within a portion of the different portions, based on determining a second group network identifiers that are not being broadcast within the portion; and
   based on the scan control data, disabling a scan for a signal from a second access point device associated with a second identifier of the network identifiers that is determined to have a second ranking that is higher than the first ranking.

17. The non-transitory machine-readable storage medium of claim 16, wherein the scan control data comprises range data indicative of a defined range of area codes associated with the visitor carrier networks, and wherein the defined range of area codes are associated with the first group of the network identifiers.

18. The non-transitory machine-readable storage medium of claim 17, wherein the operations further comprise:
   in response to determining that the user equipment is coupled to the first access point device, determining an area code assigned to the first access point device, wherein the disabling the scan comprises disabling the scan in response to determining that the area code is within the defined range of area codes.

19. The non-transitory machine-readable storage medium of claim 18, wherein the area code comprises a location area code.

20. The non-transitory machine-readable storage medium of claim 16, wherein the network identifiers are public land mobile network identifiers.

* * * * *